(12) United States Patent
Dietrich (10) Patent No.: US 7,028,205 B2
(45) Date of Patent: Apr. 11, 2006

(54) TECHNIQUES TO MONITOR TRANSITION DENSITY OF AN INPUT SIGNAL

(75) Inventor: Casper Dietrich, Roskilde (DK)

(73) Assignee: Intel Corporation, Santa Clara, CA (US)

( * ) Notice: Subject to any disclaimer, the term of this patent is extended or adjusted under 35 U.S.C. 154(b) by 656 days.

(21) Appl. No.: 10/206,378

(22) Filed: Jul. 25, 2002

(65) Prior Publication Data

US 2004/0017870 A1   Jan. 29, 2004

(51) Int. Cl.
*G06F 1/04* (2006.01)

(52) U.S. Cl. ............... 713/400; 713/503; 375/371; 375/373

(58) Field of Classification Search ........ 713/400–501, 713/503; 327/157; 375/371, 373, 376
See application file for complete search history.

(56) References Cited

U.S. PATENT DOCUMENTS

| | | | |
|---|---|---|---|
| 5,432,480 A * | 7/1995 | Popescu | 331/11 |
| 5,481,563 A | 1/1996 | Hamre | |
| 6,316,966 B1 | 11/2001 | Chang et al. | |
| 6,347,128 B1 * | 2/2002 | Ransijn | 375/376 |
| 6,531,927 B1 * | 3/2003 | Chen | 331/25 |
| 2002/0085463 A1 | 7/2002 | Minemura et al. | |
| 2003/0128779 A1 * | 7/2003 | Berger et al. | 375/340 |
| 2004/0042578 A1 * | 3/2004 | Christensen et al. | 375/376 |

FOREIGN PATENT DOCUMENTS

EP    0581477 A1    2/1994

OTHER PUBLICATIONS

Veillette, B. R. et al., "Self-calibration of digital phase-locked loops", Proceedings of the 1997 IEEE Custom Integrated Circuits Conference (Santa Clara, CA, May 5-8, 1997), ISBN No. 0-7803-3669-0, pp. 49-52, published New York, NY (1997).

IPEA/US, Written Opinion for International Application No. PCT/US03/21129, 6 pages, Aug. 17, 2005.

* cited by examiner

*Primary Examiner*—Dennis M. Butler
(74) *Attorney, Agent, or Firm*—Glen B. Choi (57) ABSTRACT

Techniques to determine and indicate the extent to which transitions of an input signal deviate from a desired transition region. In an implementation, an indication may be provided when a transition of an input signal occurs within the desired transition region and an indication may be provided when a transition of an input signal occurs outside the desired transition reagion. In an implementation, a difference between a number of times when input signal transitions occur inside and outside of the desired transition region may be provided. Accordingly, a receiver of the input signal may decide whether to ignore or use the input signal based on the difference between a number of times when input signal transitions occur inside and outside of the desired transition region.

24 Claims, 8 Drawing Sheets

TECHNIQUES TO MONITOR TRANSITION DENSITY OF AN INPUT SIGNAL

FIELD

This invention generally relates to techniques for determining the integrity of transmitted signals.

DESCRIPTION OF RELATED ART

Jitter is the general term used to describe distortion caused by variation of a signal from its reference timing position in a communications system. In an ideal system, bits arrive at time increments that are integer multiples of a bit repetition time. In an operational system, however, bits typically arrive at times that deviate from these integer multiples. This deviation may cause errors in the recovery of data, particularly when data is transmitted at high speeds. Jitter may be caused by a number of phenomena, including inter-symbol interference, frequency differences between the transmitter and receiver clock, noise, and the non-ideal behavior of the receiver and transmitter clock generation circuits.

Jitter is a problem of particular import in digital communications systems for several reasons. First, jitter causes the received signal to be sampled at a non-optimal sampling point. This occurrence reduces the signal-to-noise ratio at the receiver and thus limits the information rate. Second, in operational systems, each receiver must extract its received sampling clock from the incoming data signal. Jitter makes this task significantly more difficult. Third, in long distance transmission systems, where multiple repeaters reside in the link, jitter accumulates.

BRIEF DESCRIPTION OF THE DRAWINGS

Note that use of the same reference numbers in different figures indicates the same or like elements.

DETAILED DESCRIPTION

Figure 1:
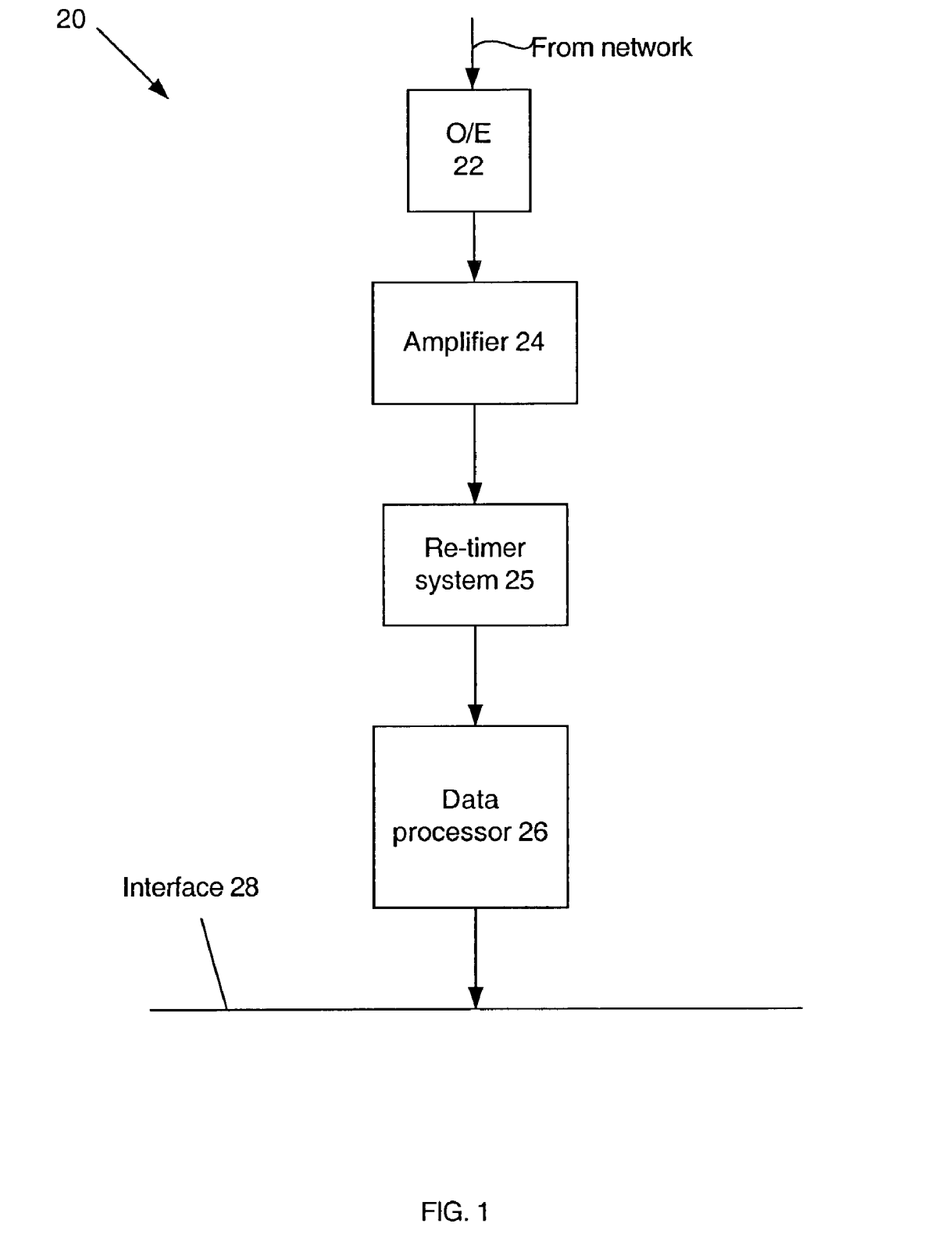
FIG. 1 depicts an example of a receiver system that may use some embodiments of the present invention.

For example, FIG. 1 depicts an example of a receiver system 20 that may use some embodiments of the present invention. Optical-to-electrical converter ("O/E") 22 may convert optical signals received from an optical network into electrical signals. Although reference has been made to optical signals, the receiver 20 may, in addition or alternatively, receive electrical signals from an electrical signal network. Amplifier 24 may amplify the electrical signals. Re-timer system 25 may regenerate the electrical signals and, in accordance with an embodiment of the present invention, may output signals indicating the integrity of regenerated electrical signals. With respect to the regenerated signals, data processor 26 may perform media access control (MAC) management in compliance for example with Ethernet, described for example in versions of IEEE 802.3; optical transport network (OTN) de-framing and de-wrapping in compliance for example with ITU-T G.709; forward error correction (FEC) processing, in accordance with ITU-T G.975; and/or other layer 2 processing. Interface 28 may provide intercommunication between data processor 26 and other devices such as a switch fabric (not depicted) or packet processor (not depicted). Interface 28 may be compliant, for example, with a vendor specific multi-source agreement (MSA) protocol. The examples described with respect to FIG. 1 by no means limit the systems in which some embodiments of the present invention may be used. For example, receiver 20 may be adapted to receive wireless or wire-line signals according to any standards.

Figure 2:
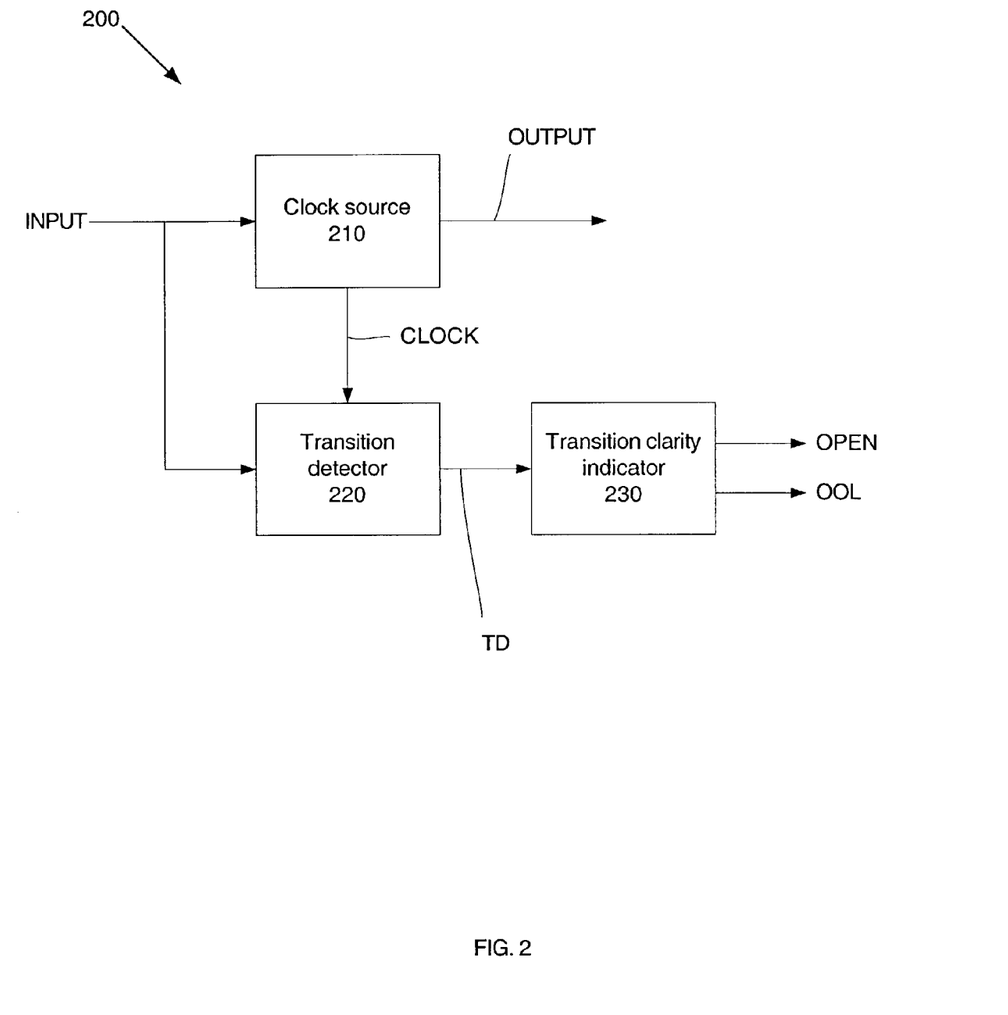
FIG. 2 depicts in block diagram form an embodiment of the present invention in a transition monitor device.

One embodiment of the present invention may include techniques to monitor the density of signal transitions. FIG. 2 depicts in block diagram form an embodiment of the present invention in transition monitor device 200. Transition monitor device 200 may include a clock source 210, transition detector 220, and transition clarity indicator 230. Transition monitor device 200 may be implemented as any of or a combination of: hardwired logic, software stored by a memory device and executed by a microprocessor, firmware, an application specific integrated circuit (ASIC), and/or a field programmable gate array (FPGA).

Clock source 210 may receive signal INPUT. Clock source 210 may output a clock signal CLOCK that has transitions substantially matched to those of signal INPUT. Clock source 210 may further output samples of signal INPUT timed to signal CLOCK (shown as OUTPUT). Transition detector 220 may receive signals INPUT and CLOCK. Transition detector 220 may output signal TD that may indicate a difference between the number of transitions occurring in (1) a phase region where transitions are desired to occur and (2) a phase region where transitions are not desired to occur. Transition clarity indicator 230 may receive signal TD. Transition clarity indicator 230 may output (1) a signal indicating the degree to which transitions of signal INPUT are confined within a desired phase region (shown as signal OPEN) and (2) a signal indicating whether transition monitor device 200 is out of lock (shown as signal OOL). For example, the desired phase region may be chosen to provide a low bit error rate for signal OUTPUT.

Figure 3:
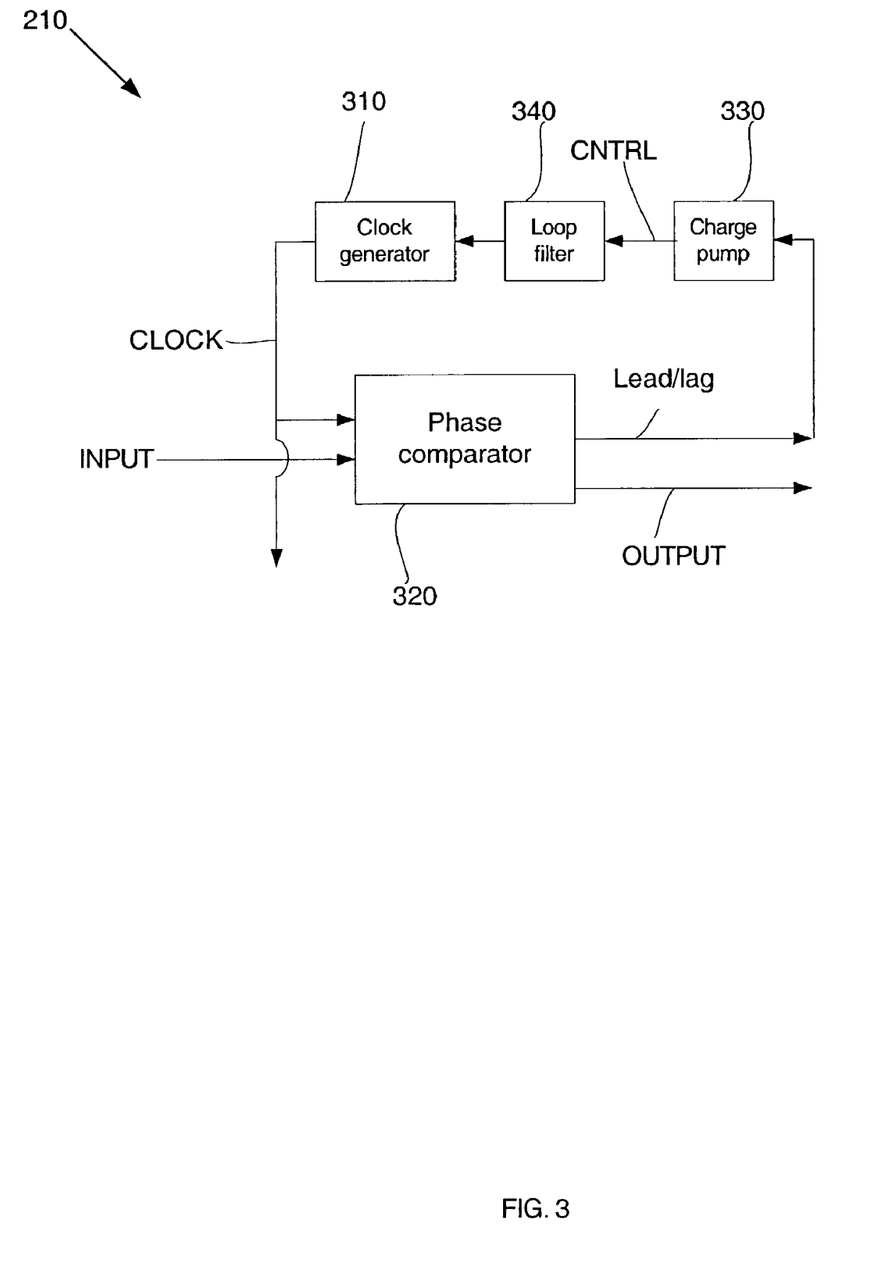
FIG. 3 depicts one possible implementation of a clock source, in accordance with an embodiment of the present invention.

FIG. 3 depicts one possible implementation of clock source 210. Clock source 210 may include clock generator 310, phase comparator 320, charge pump 330, and loop filter 340. Clock source 210 may receive signal INPUT. Clock source 210 may output a clock signal CLOCK that is substantially frequency and phase aligned with signal INPUT. Clock source 210 may further output samples of signal INPUT timed to signal CLOCK (shown as OUTPUT). Clock generator 310 may output a signal CLOCK having a frequency that is substantially similar to that of signal INPUT. For example, clock generator 310 may respond to signal CNTRL from loop filter 340 (described in more below) by increasing or decreasing the speed of signal CLOCK in relation to the magnitude or frequency of the transferred portion of signal CNTRL. Clock generator 310 may be implemented as a voltage controlled oscillator (VCO) or voltage-controlled crystal oscillator (VCXO).

Phase comparator 320 may compare the transitions of signal INPUT with those of a signal CLOCK and indicate whether the transitions of the signal INPUT lead or lag those of signal CLOCK. Phase comparator 320 may output lead/lag indicators to charge pump 330. Phase comparator 320 may output samples of signal INPUT (such output samples are shown as signal OUTPUT) timed according to signal CLOCK. Phase comparator 320 may be implemented as an Alexander ("bang-bang") type filter. One possible implementation of the Alexander phase detector is described in Electronic Letters by J. D. H. Alexander in an article entitled, Clock Recovery From Random Binary Signals, Volume 11, page 541–542, October 1975.

Charge pump 330 may receive lead/lag indicators from phase comparator 320. Charge pump 330 may output signal CNTRL that instructs the clock generator 310 to either increase or decrease the speed of signal CLOCK. For example, if charge pump 330 receives a lead indicator, signal CNTRL may correspond to charge addition to the clock generator 310 to increase the speed of the signal CLOCK. Conversely, if charge pump 330 receives a lag indicator, signal CNTRL may correspond to removal of charge from the clock generator 310 to decrease the speed of the signal CLOCK.

Charge pump 330 may output signal CNTRL to loop filter 340. Loop filter 340 may transfer signal CNTRL to clock generator 310 when the frequency of signal CNTRL is within the pass band of the loop filter 340. Clock generator 310 may receive the transferred portion of signal CNTRL. Although a charge pump and loop filter combination is provided as an example implementation, other devices may be used to selectively transfer signal CNTRL to the clock generator 310.

Figure 4:
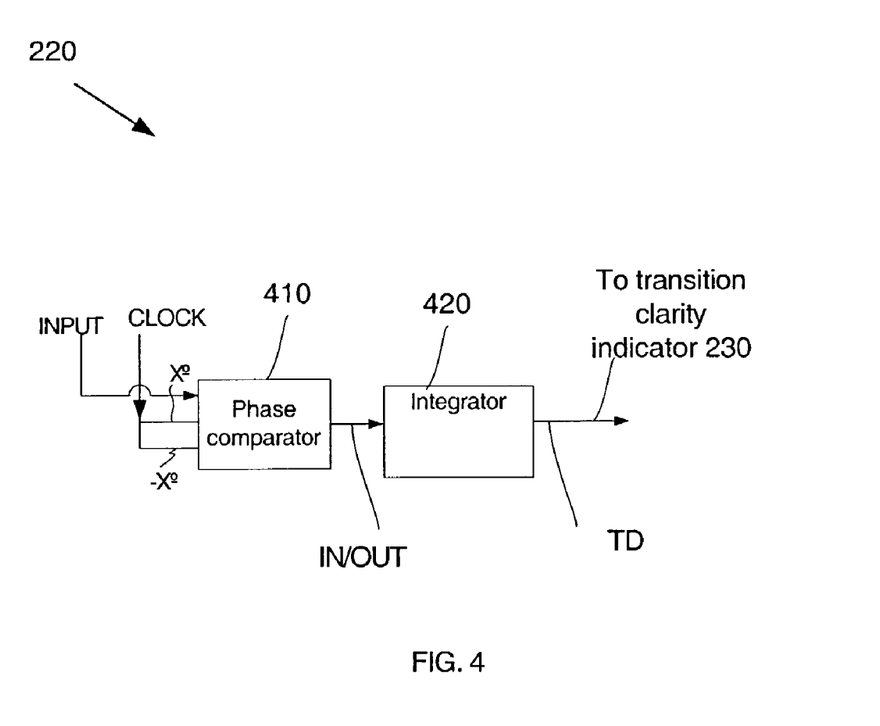
FIG. 4 depicts one possible implementation of a transition detector, in accordance with an embodiment of the present invention.

FIG. 4 depicts one possible implementation of transition detector 220. One implementation of transition detector 220 may include phase comparator 410 and integrator 420. Transition detector 220 may receive signals INPUT and CLOCK. Transition detector 220 may output signal TD that may indicate a difference between the number of transitions occurring in (1) a phase region where transitions are desired to occur and (2) a phase region where transitions are not desired to occur.

Phase comparator 410 may indicate the extent to which transitions of signal INPUT occur outside of a desired phase region. At X and –X phase degrees of the signal CLOCK, phase comparator 410 may compare the transitions (rising or falling) of the signal INPUT with transitions (rising or falling) of signal CLOCK. Phase comparator 410 may indicate whether the transitions of the signal INPUT occur (a) within a phase region where transitions are desired to occur (shown as "IN") or (b) outside of a phase region where transitions are desired to occur (shown as "OUT"). Value X may be chosen so that a majority of transitions of signal INPUT occur between X to –X degrees of signal CLOCK. Phase comparator 410 may output IN/OUT indicators to integrator 420. In one implementation, phase comparator 410 may be implemented as an Alexander ("bang-bang") type filter.

In one implementation, value X may be ninety (90) degrees. Frequent occurrences of transitions of signal INPUT outside of the phase region between ninety (90) to negative ninety (–90) degrees of signal CLOCK may indicate that the signal INPUT may be too jittered to be accurately reproduced. The value X may be varied depending a designer's specific design tolerances. For example, some designers may increase the value of X to increase a tolerable phase range in which transitions may occur whereas other designers may decrease the value of X.

Figure 5A:
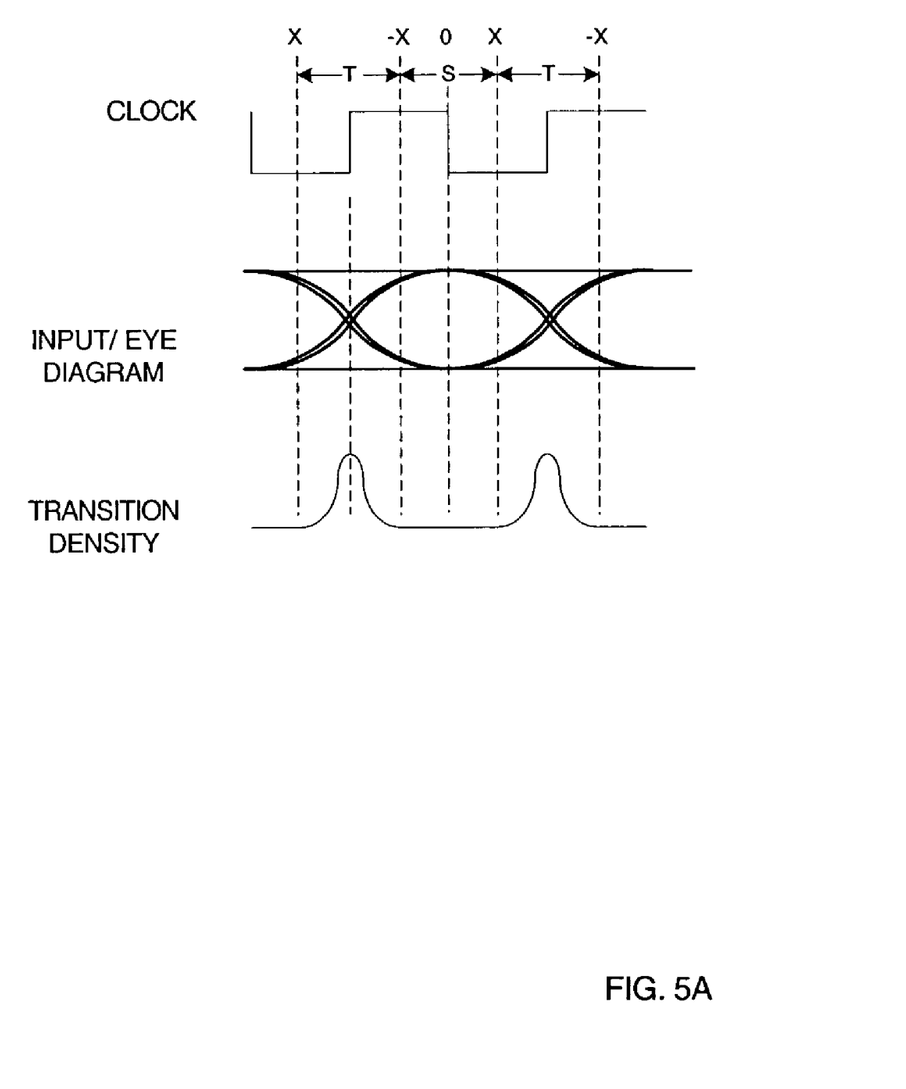
FIGS. 5A to 5C depict different transition density scenarios.
Figure 5B:
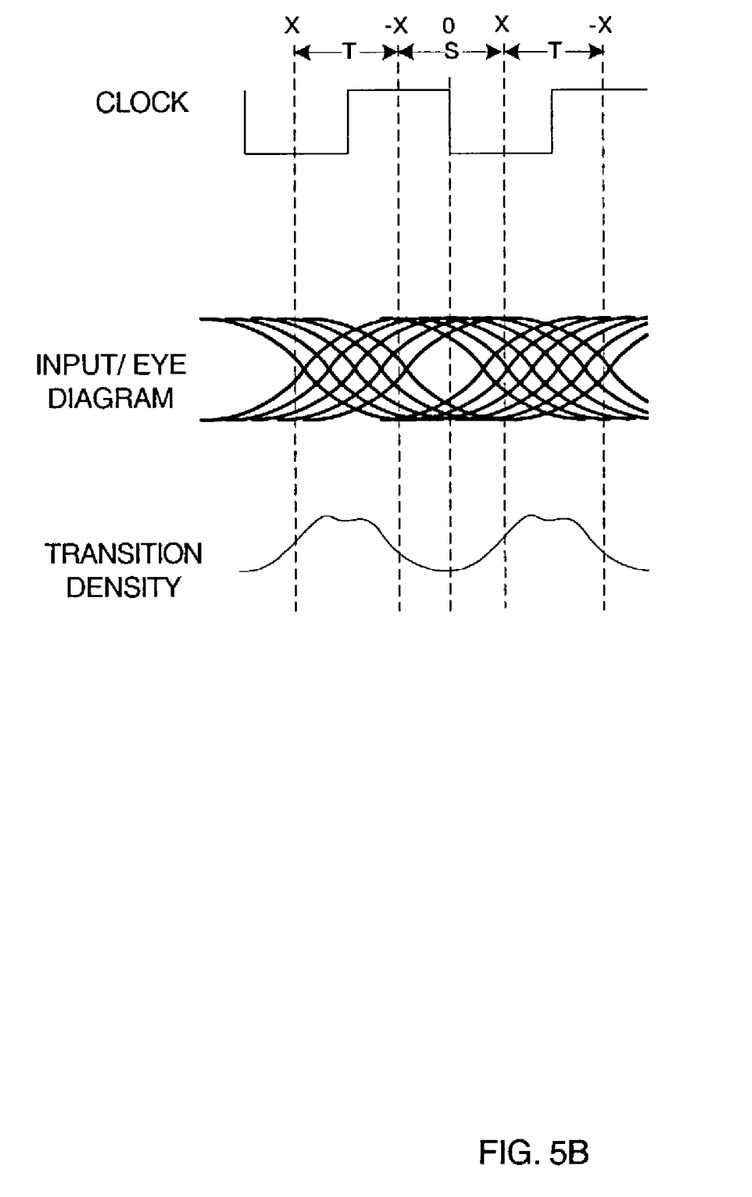
Figure 5C:
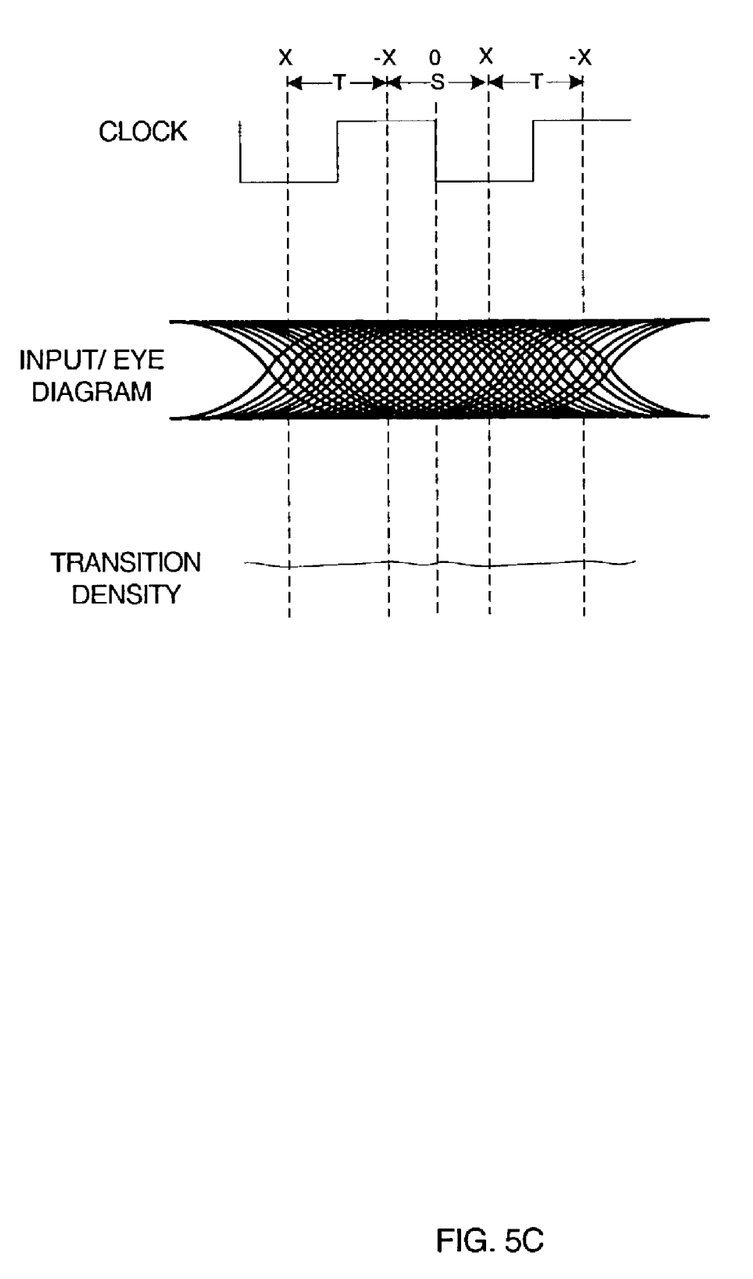

FIGS. 5A–5C depict examples of signals CLOCK, INPUT as well as associated eye diagrams and transition densities. An eye diagram may represent the phases at which transitions of signal INPUT occur. FIG. 5A depicts a so-called "open eye" scenario in which transitions of the signal INPUT occur primarily within a desired phase region (shown as region T). In this scenario, phase comparisons at X and –X degrees of signal CLOCK between transitions of CLOCK and INPUT may rarely indicate that transitions of signal INPUT occur outside of region T.

FIG. 5B depicts a so-called "closed eye" scenario in which transitions of the signal INPUT may occur substantially outside of region T (shown as region S). Accordingly, the eye diagram of signal INPUT reveals a small region in which transitions do not occur. The transition density diagram of FIG. 5B shows that the transitions of signal INPUT occur over a wide range of phases of signal CLOCK. In this scenario, phase comparisons may indicate that transitions of signal INPUT frequently occur outside of region T.

FIG. 5C depicts a so-called "out-of-lock" scenario in which transitions of the signal INPUT are randomly distributed. Accordingly, the eye diagram of signal INPUT reveals no region in which transitions do not occur. In this scenario, the frequency of signal INPUT is not matched with that of signal OUTPUT.

In some designs, it may be useful for transitions of signal INPUT to occur within a confined region, such as region T described with respect to FIGS. 5A–5C. Confined transitions may be important because samples of signal INPUT (such as signal OUTPUT of FIG. 2) may be inaccurate if samples of signal INPUT are made during a period when transitions of signal INPUT may occur. If a substantial number of transitions of signal INPUT occur outside of a desired transition phase region, the signal INPUT may be considered to have too much jitter for signal INPUT to be accurately sampled.

Referring to FIG. 4, integrator 420 may receive "IN" and "OUT" indicators from phase comparator 410. For example, with respect to FIGS. 5A to 5C, signal "IN" may indicate a transition of signal INPUT that occurs in region T, whereas signal "OUT" may indicate a transition of signal INPUT that occurs outside of region T (i.e., region S). In one implementation, an IN indicator may correspond to a positive output voltage whereas an OUT indicator may correspond to a negative output voltage. Integrator 420 may sum the voltages from phase comparator 410 and output the sum as signal TD. The signal TD may be higher in magnitude for the transition density diagram shown in FIG. 5A than for the transition density diagram shown in FIG. 5C.

Figure 6:
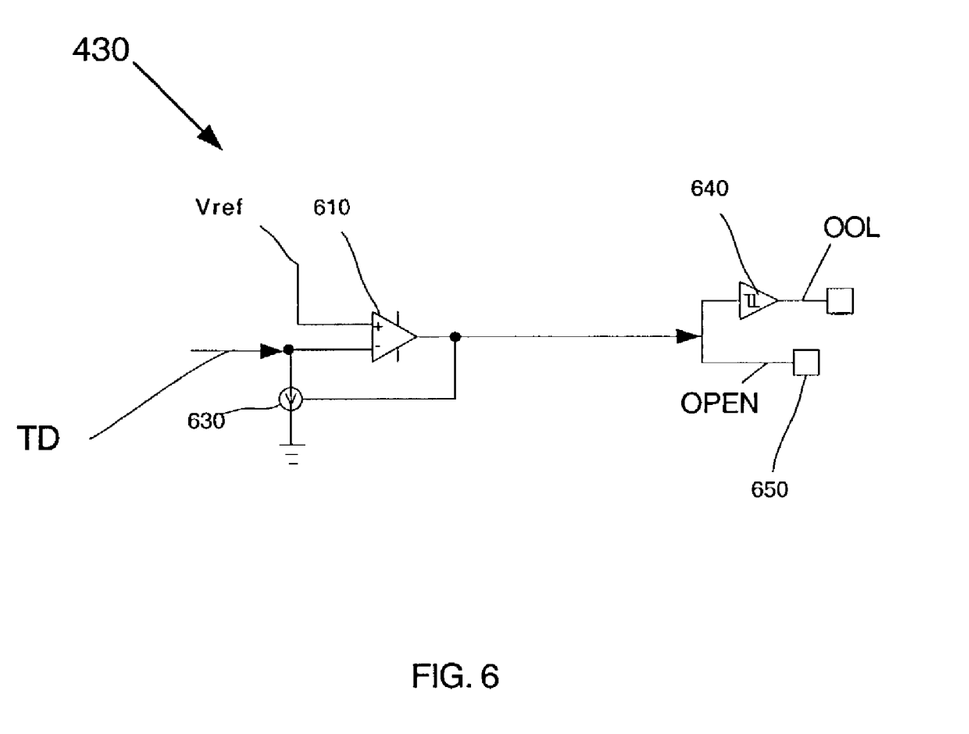
FIG. 6 depicts one possible implementation of a transition clarity indicator, in accordance with an embodiment of the present invention.

FIG. 6 depicts one possible implementation of transition clarity indicator 230 in accordance with an embodiment of the present invention. One implementation of transition clarity indicator 230 may include an operational amplifier ("op amp") 610, voltage controlled current source 630, a high-low device 640, and eye size terminal 650. The implementation described with respect to FIG. 6 is merely an example implementation. Transition clarity indicator 230 may receive signal TD. Transition clarity indicator 230 may output (1) a signal indicating the degree to which transitions of signal INPUT are confined within a desired phase region (shown as signal OPEN) and (2) a signal indicating whether transition monitor device 200 is out of lock (shown as signal OOL).

A negative input terminal of op amp 610 may receive signal TD from the integrator 420. A positive input terminal of op amp 610 may be coupled to a reference voltage, Vref. An output terminal of op amp 610 may provide a negative feedback loop to control the current from the current source 630. The output terminal of op amp 610 may further be coupled to the high-low device 640 and eye size terminal 650.

Op amp 610 may sense the charge applied to integrator 420 (FIG. 4) and change the current of the current source 630 to match the charge supplied to the integrator 420 so that signal TD is approximately the same voltage as the reference voltage, Vref.

For example, as the signal TD increases beyond the reference voltage value, Vref, the op amp 610 increases the magnitude of current output by current source 630. As the signal TD decreases below the reference voltage value, Vref, the op amp 610 decreases the magnitude of current output by current source 630. A large difference between signal TD and a threshold voltage value may correspond to confined transitions of signal INPUT (for example, as described with respect to FIG. 5A). A small difference between signal TD and a threshold voltage value may correspond to a random distribution of transitions of signal INPUT (for example, as described with respect to FIG. 5C).

High-low device 640 may receive an output from op amp 610. High-low device 640 toggles its output (shown as signal OOL) between high and low depending on whether the output from op amp 610 is, for example, below a programmed threshold value. If the output from the op amp 610 is, for example, below the programmed threshold value, then transitions of signal INPUT may be sufficiently random (such as that described with respect to FIG. 5C) so to be associated with an out-of-lock scenario. Accordingly, the output from high-low device 640 may indicate when signals INPUT and OUTPUT are clean and useable or the opposite. High-low device 640 may be implemented as a Schmidt trigger.

Eye size terminal 650 may receive an output from the op amp 610. The output from eye size terminal 650 (shown as signal OPEN) may linearly relate to the magnitude of current from current source 630. Accordingly, eye size terminal 650 may indicate the degree to which transitions of signal INPUT occur outside of a desired transition region. For example, a voltage output by eye size terminal 650 may be higher for confined transition distributions than for random transition distributions.

A device external to the transition monitor device 200 may determine to ignore the signals INPUT and/or OUTPUT using signals OPEN and OOL. For example, with respect to FIG. 1, when transition monitor device 200 is used in combination with re-timer system 25, transition monitor device 200 may provide signals OPEN and OOL to data processor 26. Data processor 26 may use the signals OOL and/or OPEN to determine whether to ignore the signal OUTPUT. Data processor 26 may decide to ignore signal OUTPUT because the reliability of the samples is too low due to the high magnitude of uncertainty of the transition point of signal INPUT. One advantage may be that this action increases the confidence in early loss-of-signal alarm.

The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
    establishing a transition phase region in reference to a first signal;
    determining whether transitions of a second signal occur outside of the transition phase region;
    providing an indication of a number of times that transitions of the second signal occur inside of the transition phase region; and
    providing an indication of a number of times that transitions of the second signal occur outside of the transition phase region.

2. The method of claim 1, wherein the transition region is between approximately X and −X phase angles of the first signal.

3. The method of claim 1, wherein the transition region is a phase region of the first signal in which transitions of the second signal are desired to substantially occur.

4. The method of claim 1, further comprising:
    providing a net difference between number of times transitions occur inside and outside of the transition phase region.

5. The method of claim 4, further comprising:
    selectively indicating that the second signal is unusable in response to the net difference being below a threshold.

6. An apparatus comprising:
    a clock source to output a first signal; and
    a transition detector to provide an indication of a number of times that transitions of a second signal occur inside of a transition phase region and to provide an indication of a number of times that transitions of the second signal occur outside of the transition phase region, wherein the transition phase region comprises a phase region in reference to the first signal.

7. The apparatus of claim 6, wherein the transition phase region is set to define a region in which transitions of the second signal are desired to occur.

8. The apparatus of claim 6, wherein the clock source comprises:
    a clock generator to provide the first signal;
    a phase comparator to receive the first and second signals and to indicate when the first and second signals differ in phase and to provide a phase difference signal indicative of a phase difference;
    a charge pump to receive the phase difference signal and to provide a control signal based upon the phase difference; and
    a filter to integrate the control signal and to provide an instruction to the clock generator to change the speed of the first signal based upon the integration.

9. The apparatus of claim 6, wherein the transition detector comprises:
    a phase comparator to receive the first and second signals and to indicate whether transitions of the second signal occur inside or outside of the transition phase region; and
    an integrator to receive the inside and outside indications and to determine a net difference based on the indications.

10. The apparatus of claim 9, wherein the phase comparator comprises an Alexander-type phase detector.

11. The apparatus of claim 9, further comprising a transition clarity indicator to receive the net difference, wherein the transition clarity indicator comprises:
    an operational amplifier to compare a reference signal and the net difference;
    a voltage controlled current source to output current based upon the comparison from the operational amplifier;
    a high-low device to indicate an out-of-lock condition based on the current; and
    an eye size terminal to indicate the net difference based on the current.

12. The apparatus of claim 6, wherein the transition phase region is between approximately X and −X phase angles of the first signal.

13. A system comprising:
an amplifier to receive a first signal and to amplify the first signal;
a clock source to output a second signal;
a transition detector to receive the first and second signals and to provide an indication of a number of times transitions of the first signal occur inside a transition phase region and to provide an indication of a number of times transitions of the first signal occur outside the transition phase region, wherein the transition phase region is in reference to the second signal; and
a data processor to receive the indications and to determine when to ignore the first signal.

14. The system of claim 13, wherein the data processor comprises logic to perform layer 2 processing.

15. The system of claim 13, further comprising:
an optical-to-electrical converter to convert an optical signal into an electrical signal and to provide the electrical signal to the amplifier as the first signal.

16. The system of claim 13, wherein the data processor comprises logic to ignore the first signal based on the indications and a threshold.

17. The system of claim 13, wherein the data processor comprises logic to perform media access control in compliance with IEEE 802.3.

18. The system of claim 13, wherein the data processor comprises logic to perform optical transport network deframing in compliance with ITU-T G.709.

19. The system of claim 13, wherein the data processor comprises logic to perform optical transport network dewrapping in compliance with ITU-T G.709.

20. The system of claim 13, wherein the data processor comprises logic to perform forward error correction processing in compliance with ITU-T G.975.

21. The system of claim 13, further comprising a data bus to receive signals from the data processor and to provide signals to the data processor.

22. The system of claim 21, further comprising a switch fabric coupled to the data bus.

23. The system of claim 21, further comprising a packet processor coupled to the data bus.

24. The system of claim 13, wherein the transition phase region is between approximately X and −X phase angles of the second signal.

* * * * *